Aug. 3, 1943.　　　A. F. PITYO　　　2,325,978
CONTAINER COVER APPLYING MACHINE
Filed Oct. 25, 1938　　　15 Sheets-Sheet 1

INVENTOR
Albert F. Pityo
BY Charles D. King
ATTORNEY

Aug. 3, 1943.　　　A. F. PITYO　　　2,325,978
CONTAINER COVER APPLYING MACHINE
Filed Oct. 25, 1938　　　15 Sheets-Sheet 2
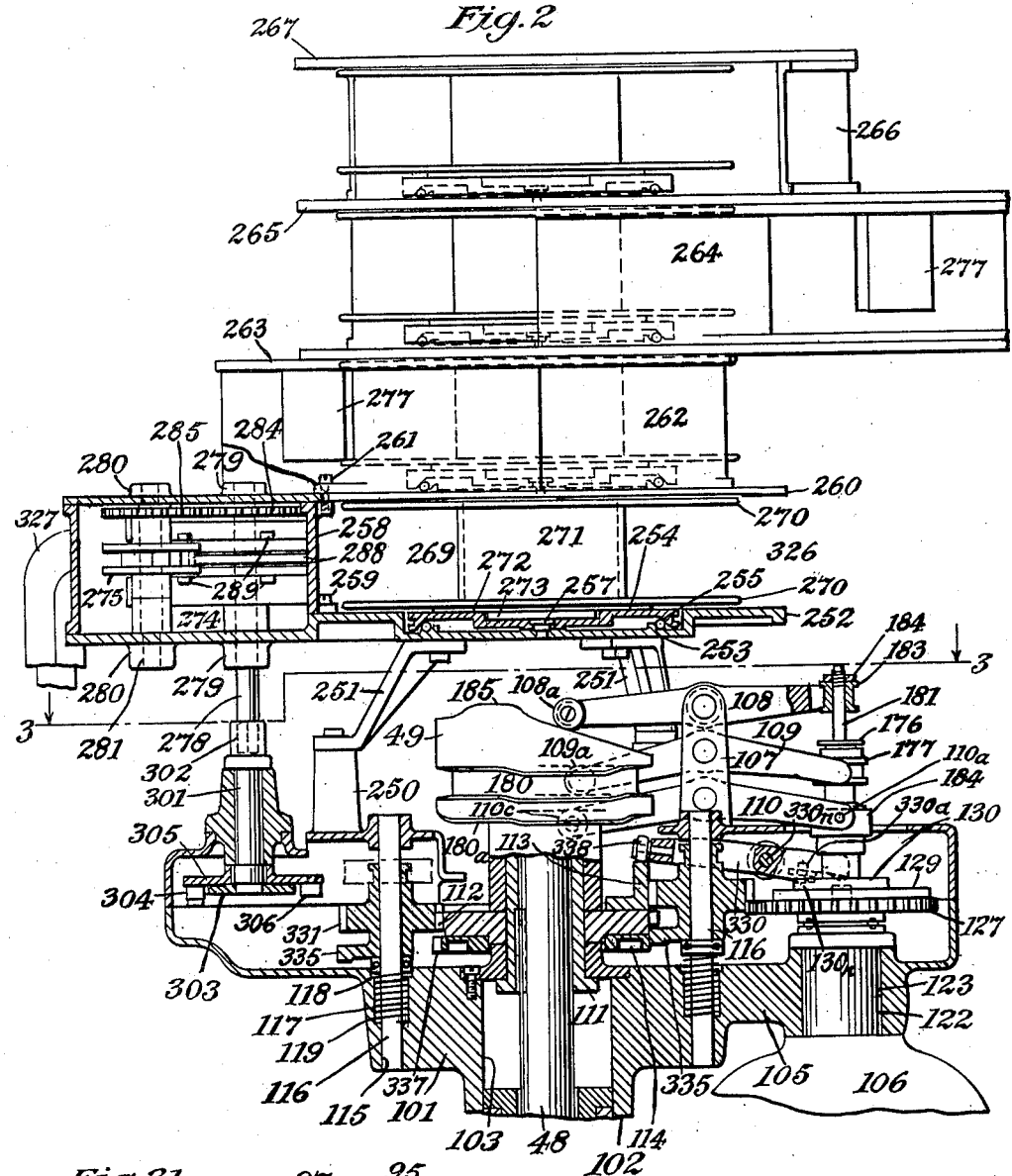
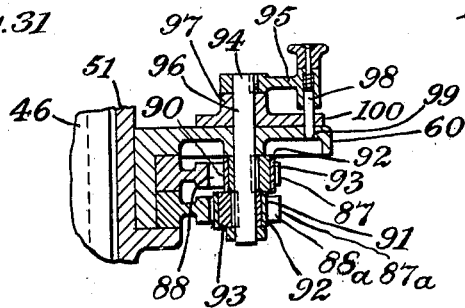
INVENTOR
*Albert F. Pityo*
BY *Charles D. King*
ATTORNEY Aug. 3, 1943.　　　　A. F. PITYO　　　　2,325,978
CONTAINER COVER APPLYING MACHINE
Filed Oct. 25, 1938　　　15 Sheets-Sheet 3
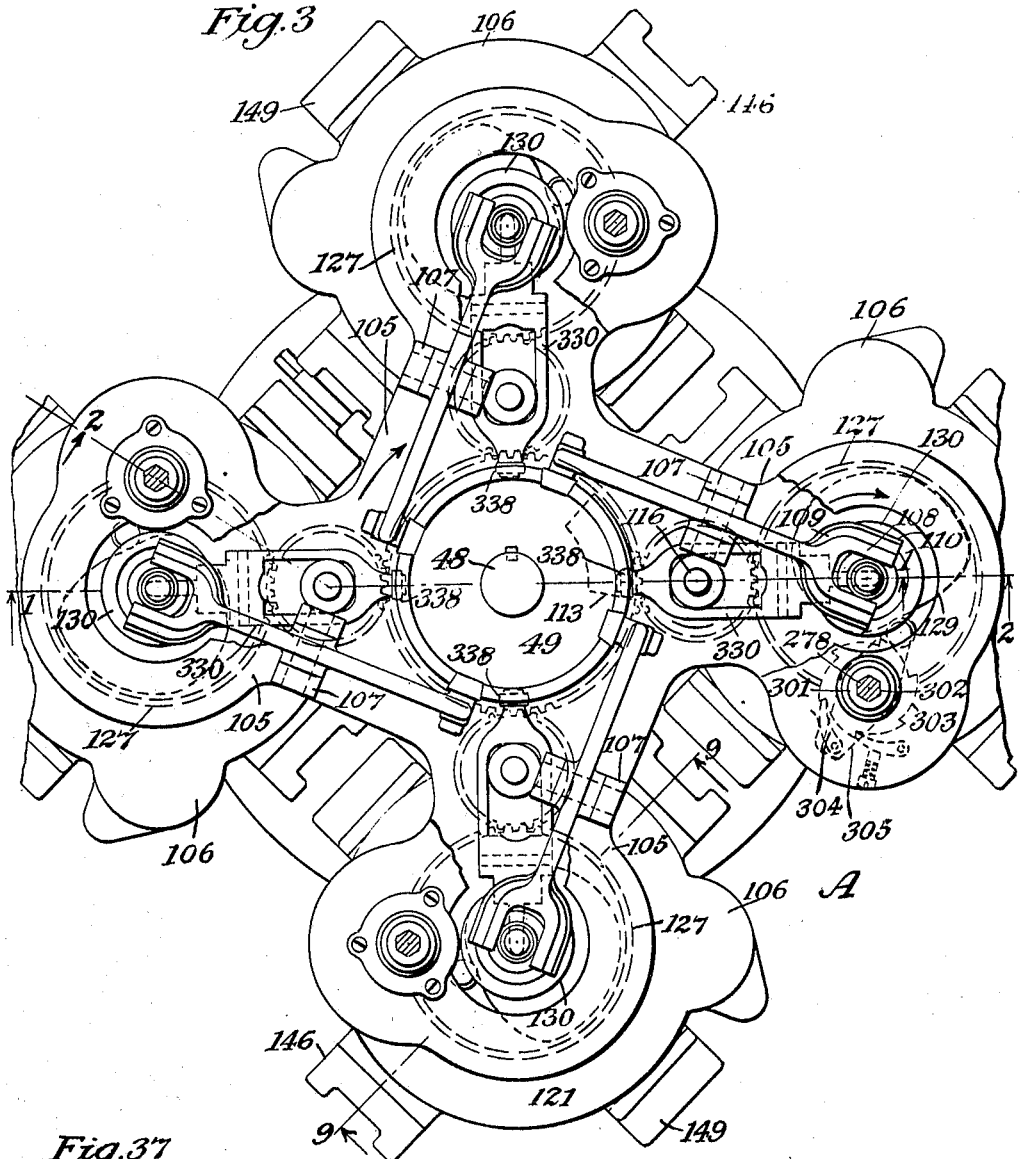
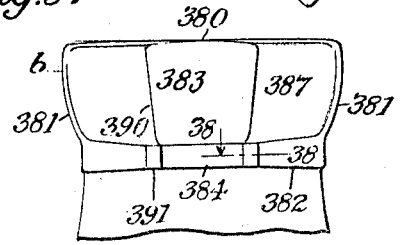
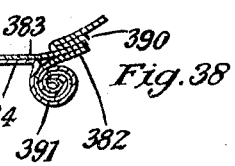
INVENTOR
Albert F. Pityo
BY
Charles D. King
ATTORNEY Aug. 3, 1943.  A. F. PITYO  2,325,978
CONTAINER COVER APPLYING MACHINE
Filed Oct. 25, 1938  15 Sheets-Sheet 4
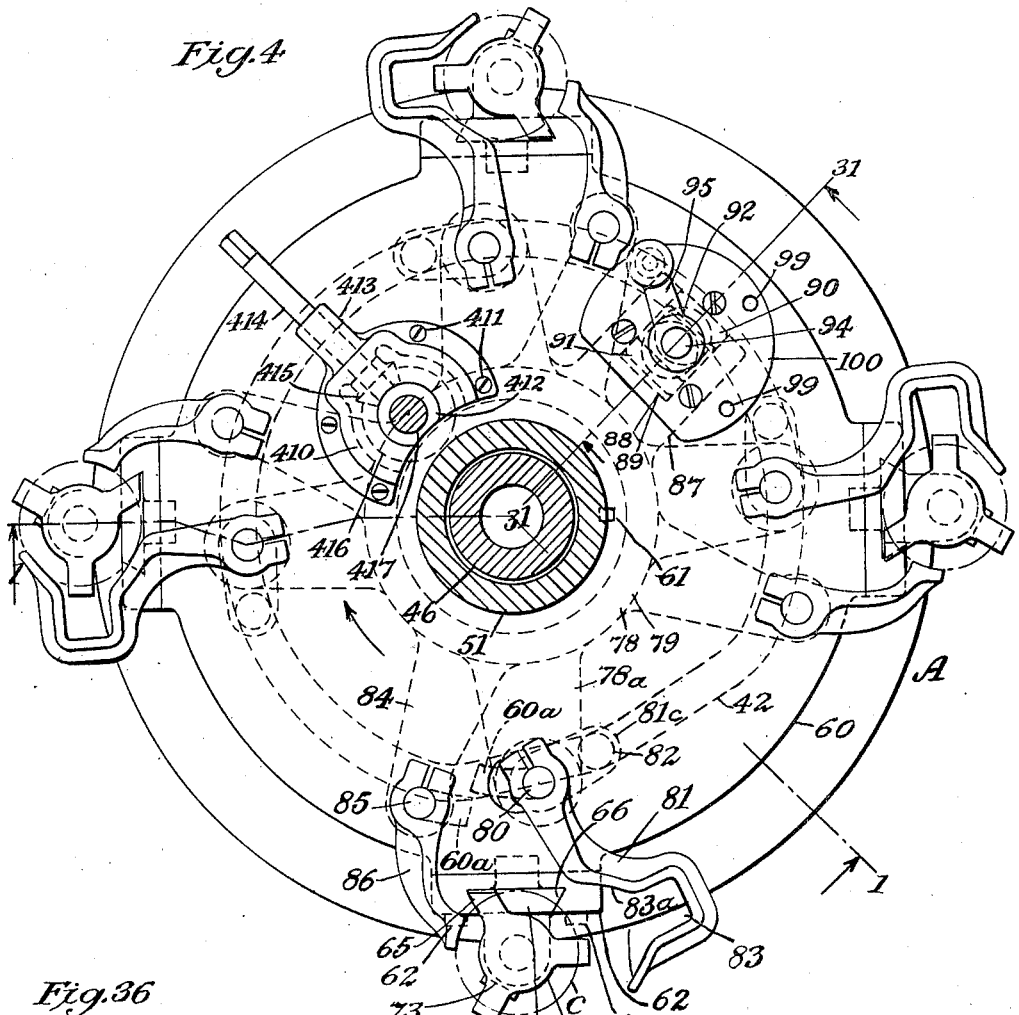
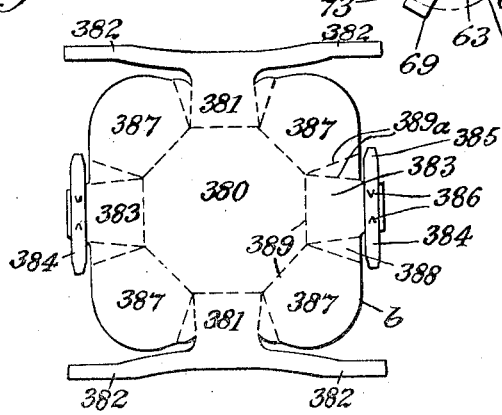
INVENTOR
Albert F. Pityo
BY
Charles D. King
ATTORNEY

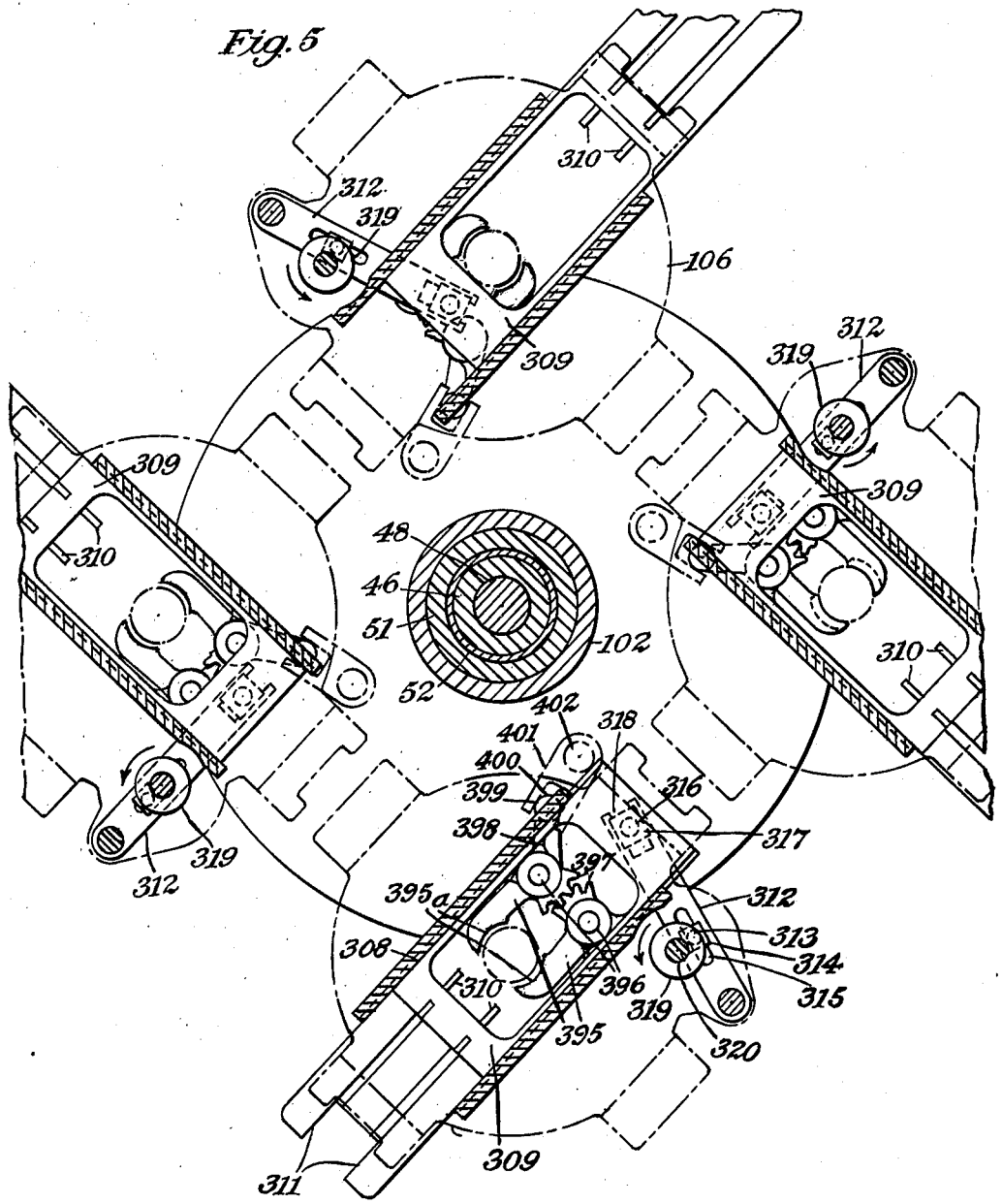

Aug. 3, 1943.  A. F. PITYO  2,325,978
CONTAINER COVER APPLYING MACHINE
Filed Oct. 25, 1938  15 Sheets-Sheet 7
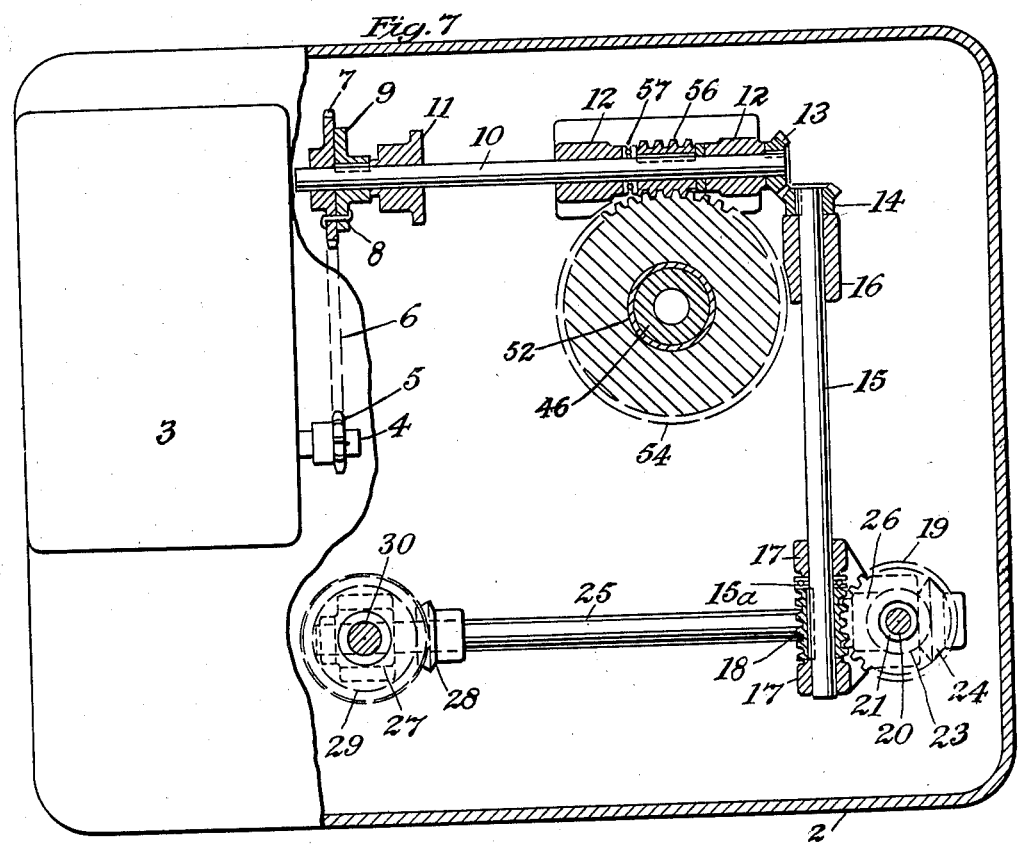
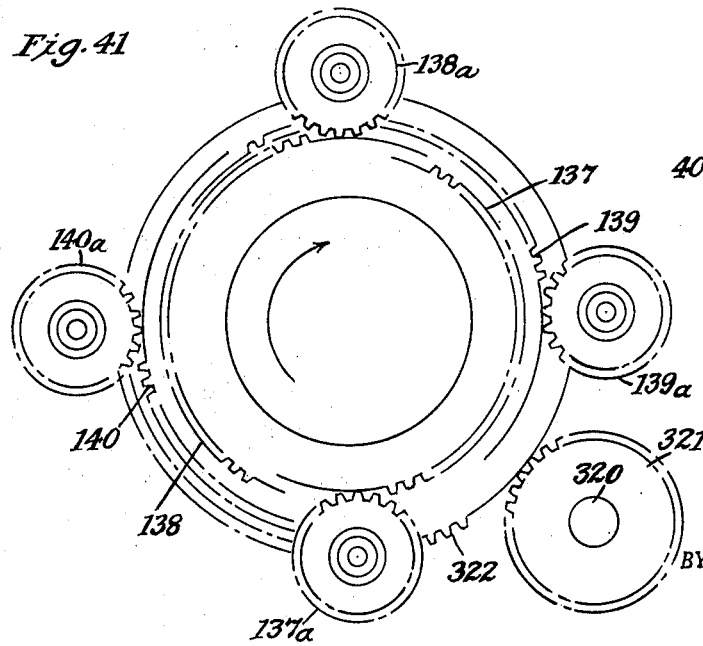
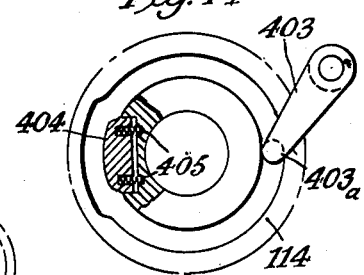
INVENTOR
Albert F. Pityo
BY Charles D. King
ATTORNEY Aug. 3, 1943.  A. F. PITYO  2,325,978
CONTAINER COVER APPLYING MACHINE
Filed Oct. 25, 1938    15 Sheets-Sheet 8
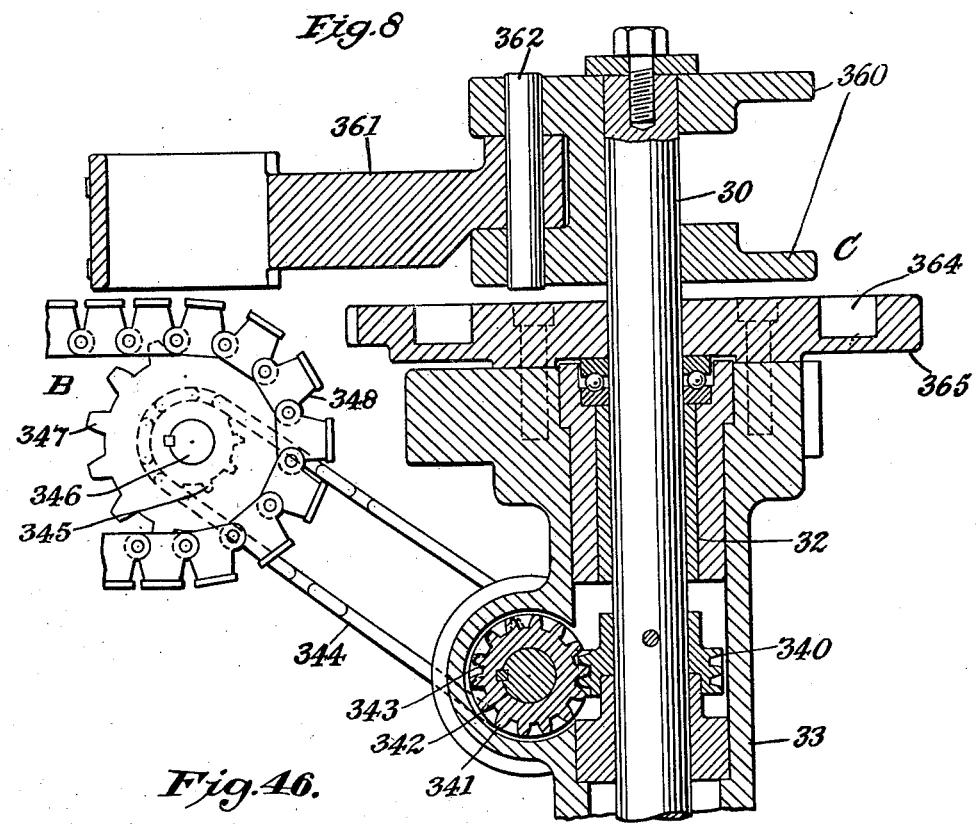
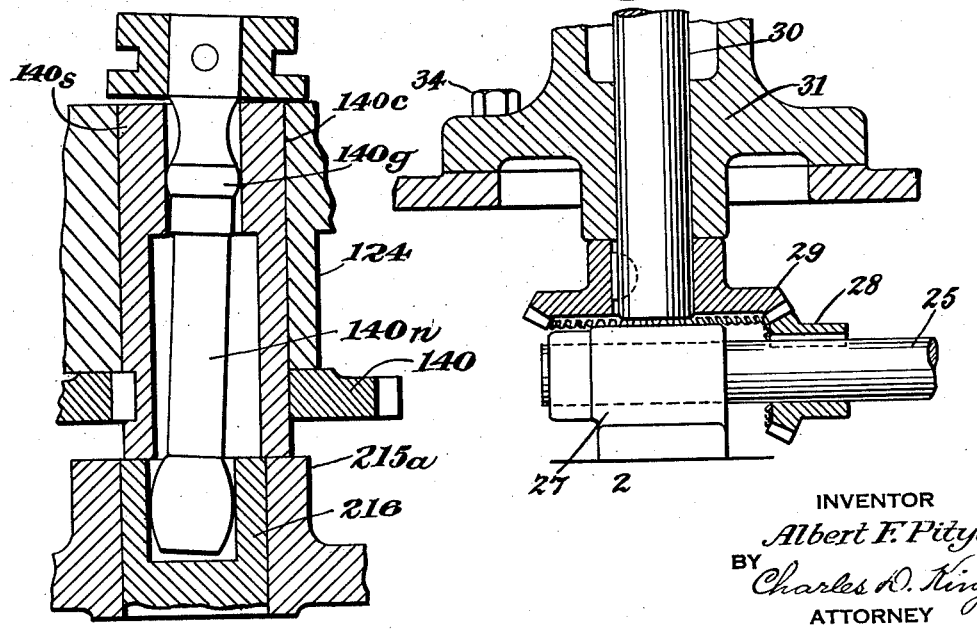
INVENTOR
Albert F. Pityo
BY Charles D. King
ATTORNEY

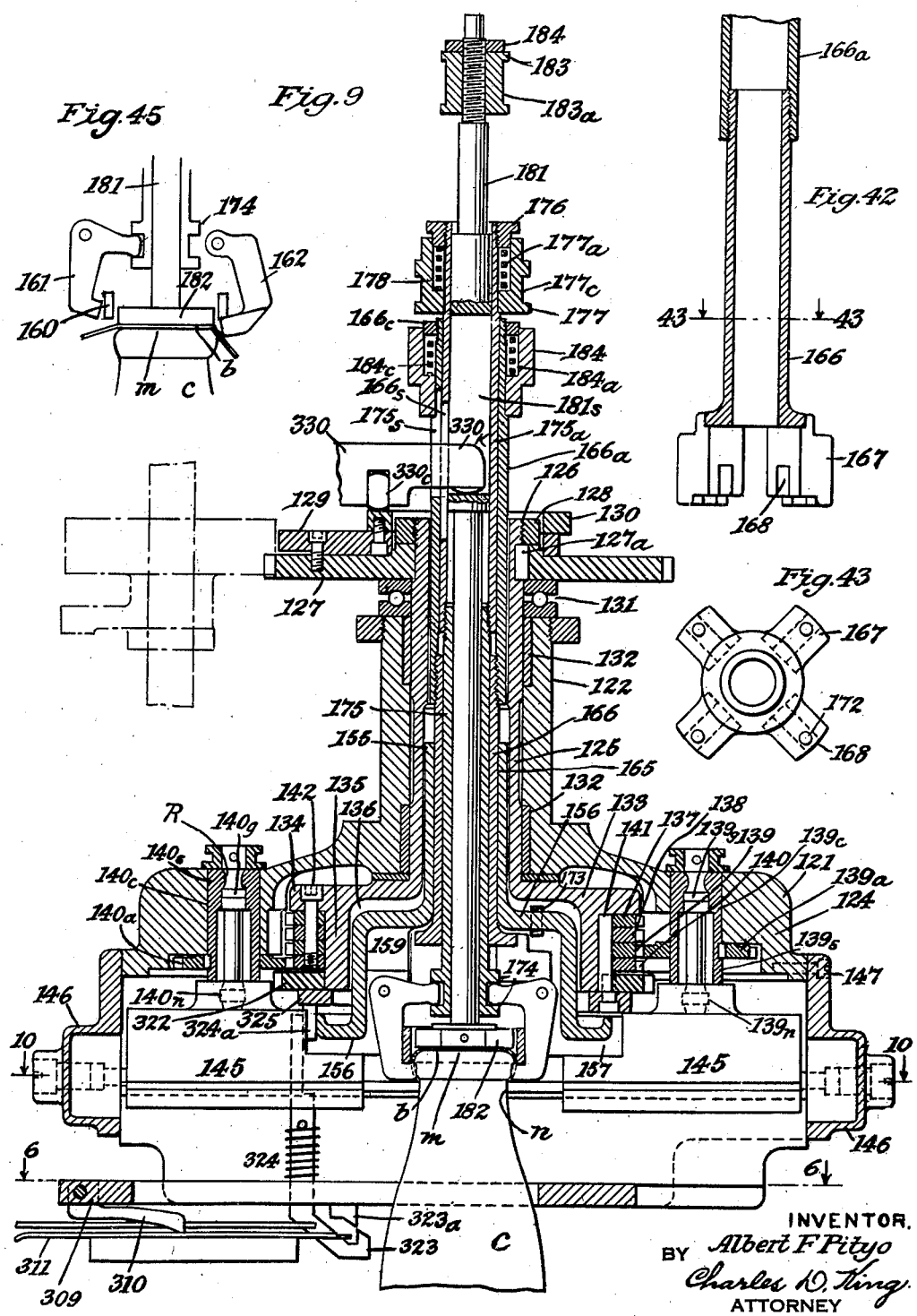

Aug. 3, 1943.  A. F. PITYO  2,325,978
CONTAINER COVER APPLYING MACHINE
Filed Oct. 25, 1938  15 Sheets-Sheet 10

INVENTOR
Albert F. Pityo
BY
Charles D. King
ATTORNEY

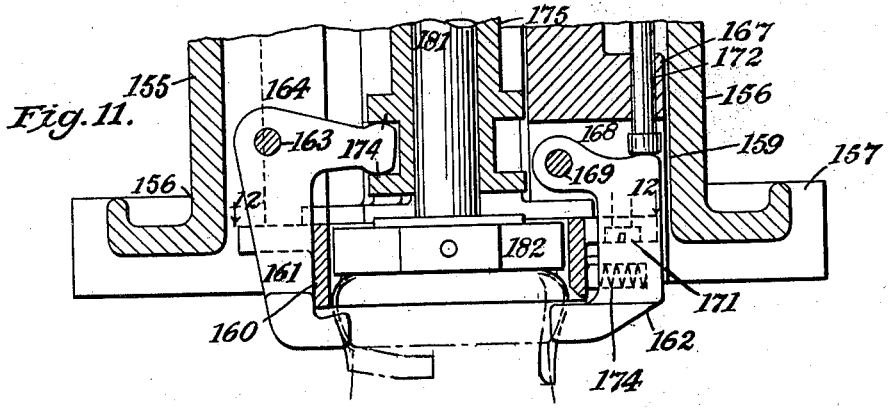
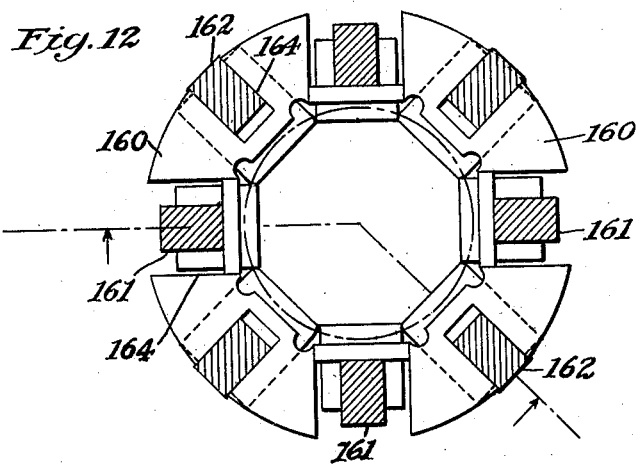
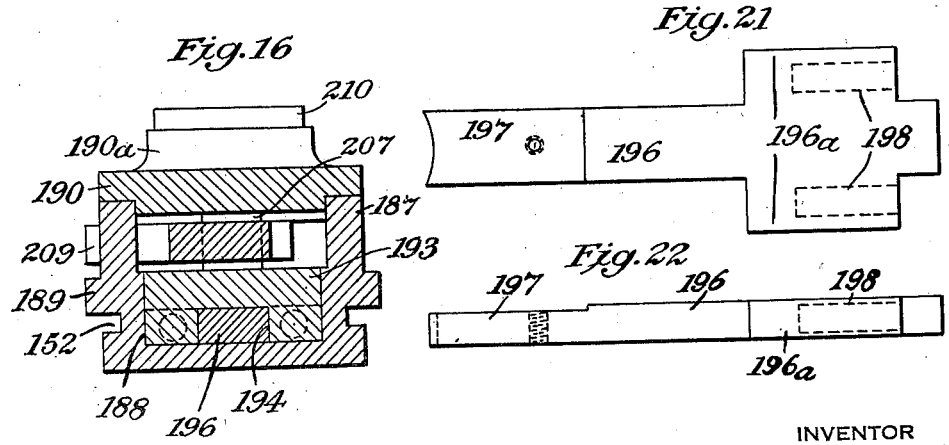
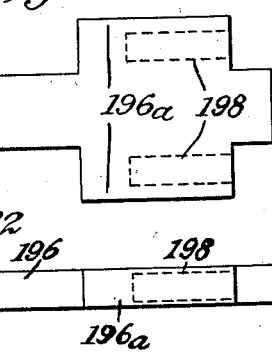

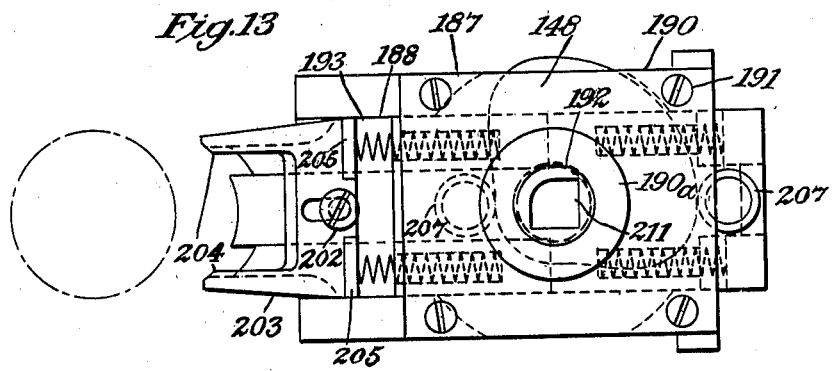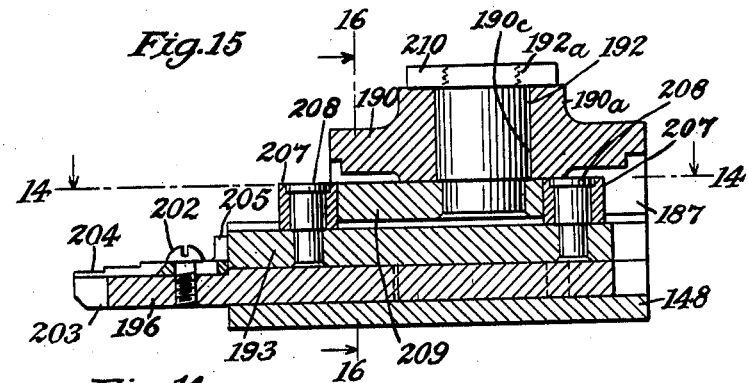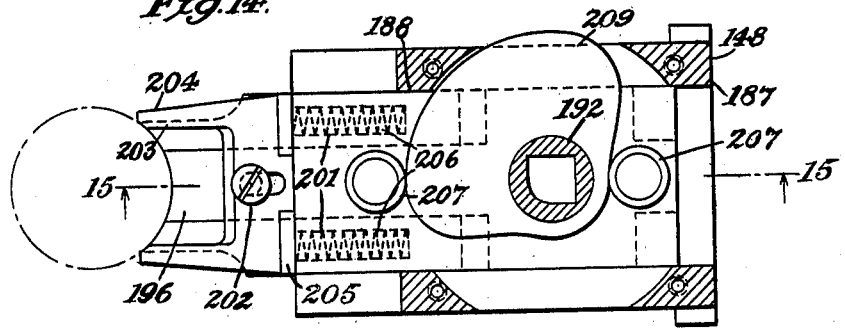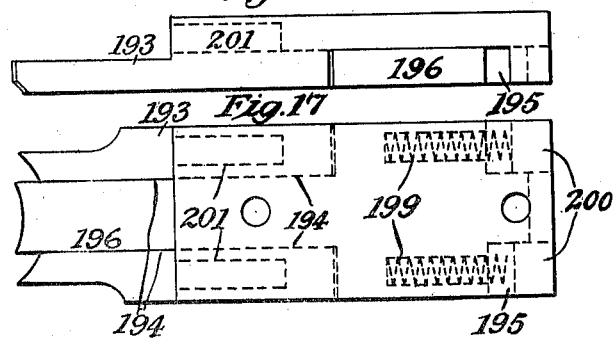

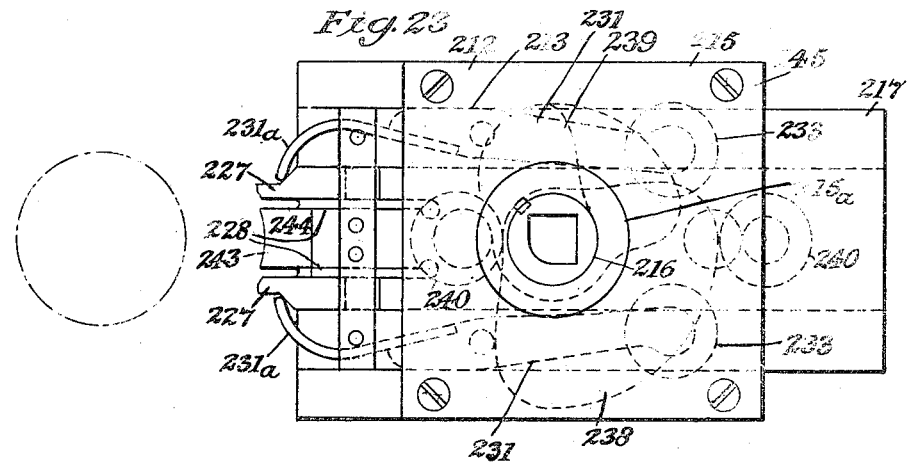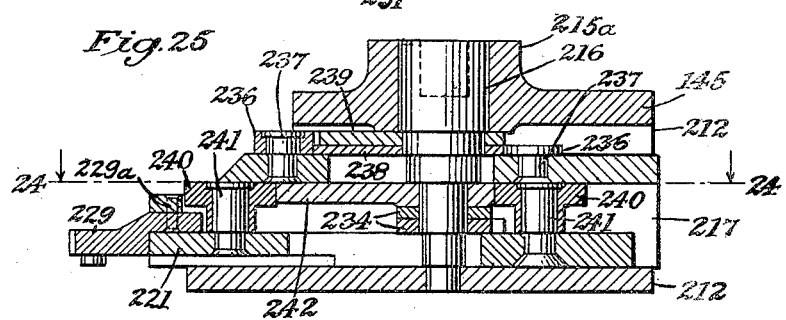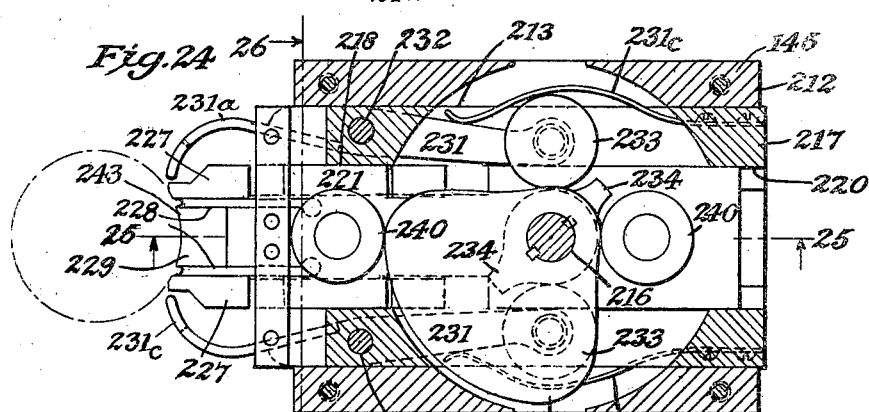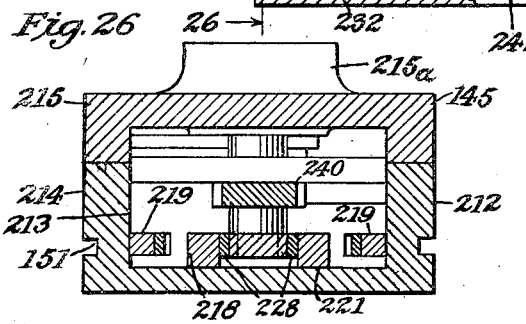

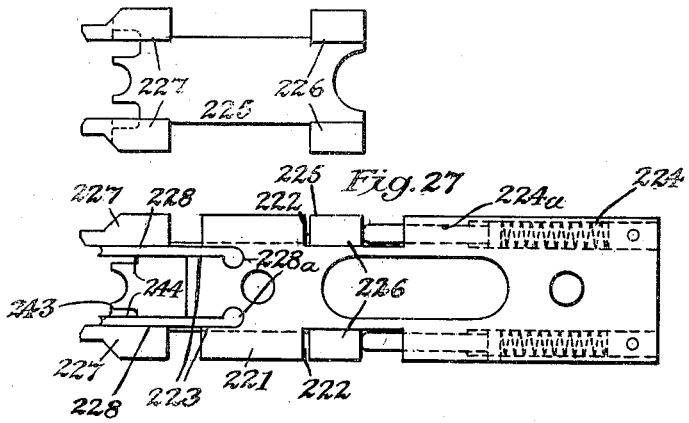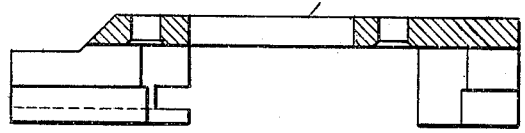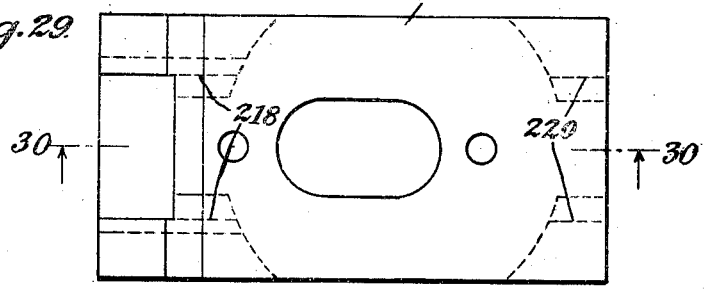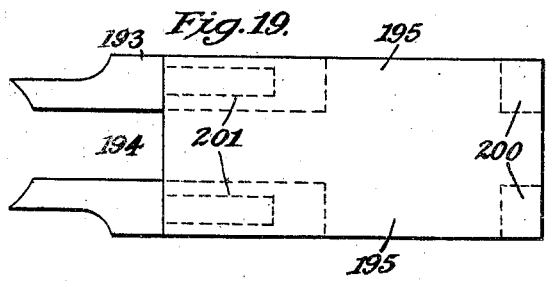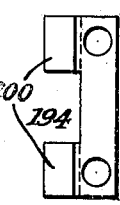

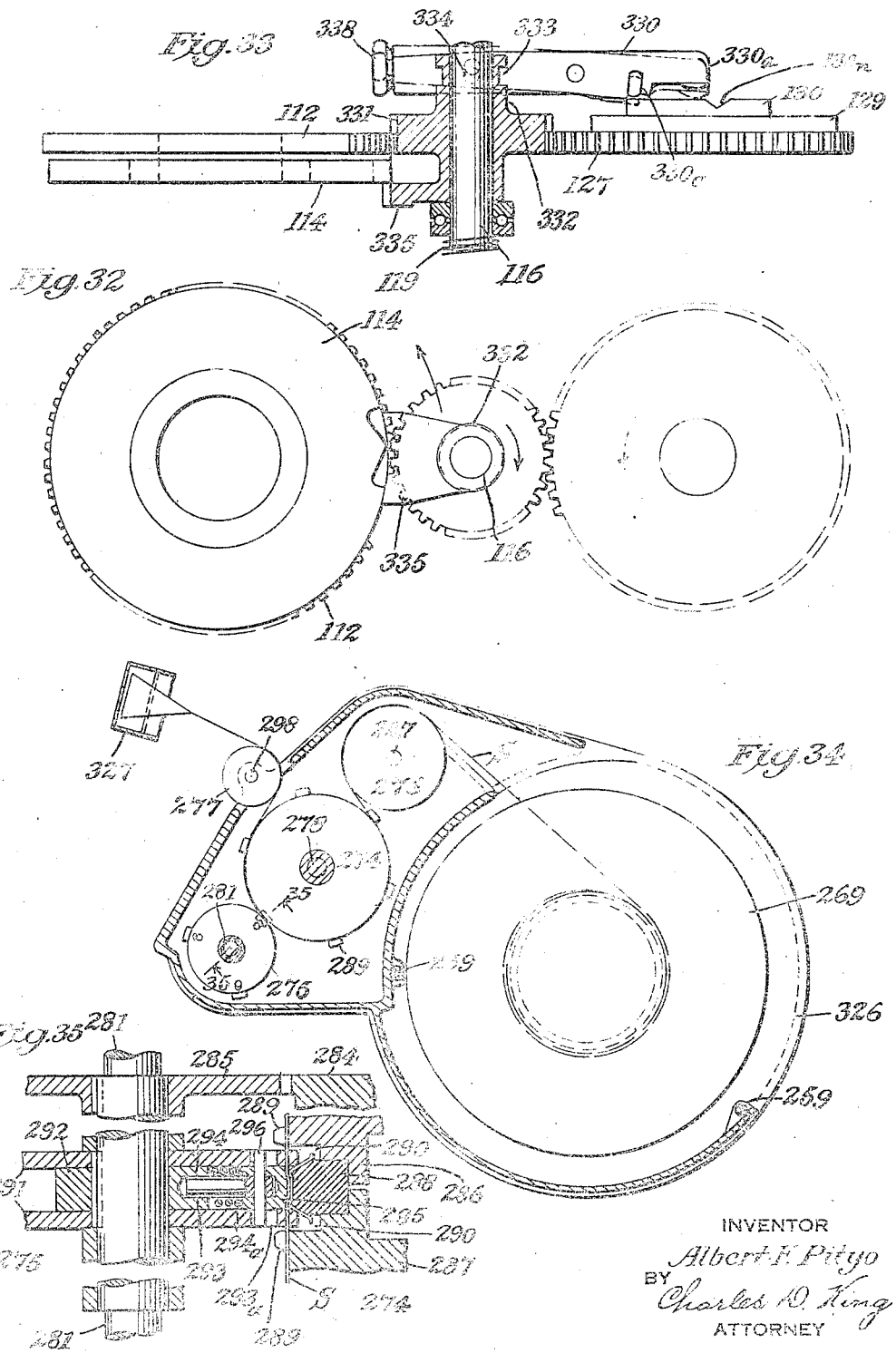

Patented Aug. 3, 1943

2,325,978

UNITED STATES PATENT OFFICE 2,325,978

CONTAINER COVER APPLYING MACHINE

Albert F. Pityo, Clifton, N. J., assignor to Tri State Cap & Cap Machinery Co., Inc., Newark, N. J., a corporation of New Jersey Application October 25, 1938, Serial No. 236,846

15 Claims. (Cl. 226—81)

This invention relates to machines for applying container covers to containers and particularly to machines for applying hood covers or caps to bottles and the like.

One of the principal objects of the invention is to provide improved means for folding the sections of a hood container cover around the container neck. A further object is to provide means to secure laterally tabbed hood covers to containers. Another object is to provide means for folding laterally tabbed and fastener carrying sections on hood container covers. A further object is to provide means for securing pre-attached fasteners to the lateral tabs of such sections to secure the covers on containers, and means for pre-bending such fasteners.

Another object is to provide initial hood applying means and final hood securing means surrounding and outward of the initial means, the first means controlled by stationary cam means.

Another object is to produce a machine for applying container covers in which the inner or central portion of the cover blanks are first brought against the container mouth, then the skirt sections are folded around the container neck, after which oppositely disposed lateral tabs at the outer parts of the blank are aligned to fasteners pre-attached to the blank and which have been pre-bent just previous to entering the folding mechanism and then to secure parts of the fasteners to the lateral tabs by suitable means such as by rolling or curling them together, thus finally securing the cover on the container.

The machine embodies means to supply containers filled but not supplied with hood covers, and said mechanism is adapted to space the containers apart to the proper distance required when applying the covers, and then transfer them to the cover applying mechanism. The latter mechanism is then caused to operate and in this machine it embodies four cover applying heads parts of which are caused to revolve each on its own axis and also all four heads together are caused to revolve about the central axis of the machine.

There is a revolving table on which the containers are held aligned to the above-mentioned heads as said table revolves and on said table the containers are raised and lowered to bring them to levels to suit the various operations of applying the covers. When the cover applying operation is completed the covered and sealed containers are moved from the revolving table onto a suitable discharge conveyor and then disposed of as desired.

The supply of cover material is preferably arranged in a series of rotatable rolls of strips of blanks and said rolls are preferably mounted with their axes of rotation on a common vertical line. They are housed in a series of superposed casings, each casing provided with suitable guide rollers and blank strip chutes. Combined with the guide rollers are means for pre-bending parts of the fasteners which have previously been attached to the blanks.

Each cover applying head contains a die member to fold the central part of a cover blank and is also provided with a plurality of folders or folding fingers to fold the parts of the cover adjacent to the periphery thereof. Each head is also provided with two oppositely disposed housings in which the tab aligning mechanism is located, and at right angles to said mechanism substantially on the same plane are two housings oppositely disposed to each other and containing the fastener applying devices or curlers for finally securing the lateral tabs and fasteners together.

The above mechanisms are provided with suitable actuating means and are so arranged that two sizes of containers or more can be covered at different times by changes in the position of certain parts.

The means I prefer to employ for accomplishing the above objects together with other novel and advantageous features of my improved machine for applying covers to containers, are illustrated in the drawings accompanying and forming part of this specification, and in which—

Fig. 2 is a vertical sectional elevation of the upper part of the machine taken on the line 2—2 of Fig. 3.

Fig. 3 is a horizontal section taken on the line 3—3 of Fig. 2.

Fig. 4 is a horizontal section taken on the line 4—4 of Fig. 1.

Fig. 5 is a horizontal section taken on the line 5—5 of Fig. 1.

Fig. 7 is a plan partly in horizontal section on the line 7—7 of Fig. 1.

Fig. 8 is an enlarged vertical section taken on the line 8—8 of Fig. 6.

Fig. 9 is an enlarged central vertical section of one of the cover applying heads taken on the line 9—9 of Fig. 3.

Fig. 11 is an enlarged vertical sectional elevation of the lower central part of a cover applying head and taken at the middle part of the line 9—9 of Fig. 3.

Fig. 12 is a sectional plan taken at the line 12—12 of Fig. 11.

Fig. 13 is a plan of one of the tab aligning devices of a cover applying head, the parts of said device being in their retracted position.

Fig. 14 is a plan of said device with the parts in their projected position.

Fig. 15 is a longitudinal section of the device taken on the line 15—15 of Fig. 14.

Fig. 16 is a transverse section of the same taken on the line 16—16 of Fig. 15.

Fig. 17 is a plan of a portion of the tab aligning device.

Fig. 18 is a side elevation of the same.

Fig. 19 is a plan of the member 193.

Fig. 20 is an end elevation of the same.

Fig. 21 is a plan of the member 196.

Fig. 22 is a side elevation of the same.

Fig. 23 is a plan of one of the fastener applying devices or curlers of a cover applying head, showing the parts in their retracted position.

Fig. 24 is a horizontal section of the same taken on the line 24—24 of Fig. 25 the parts being shown in their projected position.

Fig. 25 is a longitudinal vertical section taken on the line 25—25 of Fig. 24.

Fig. 26 is a transverse vertical section of the curling device taken on the line 26—26 of Fig. 24.

Fig. 27 is a plan of the curler carying slides.

Fig. 28 is a plan of the outer curler slide.

Fig. 29 is a plan of the main slide of the curling device.

Fig. 30 is a longitudinal section of the same taken on the line 30—30 of Fig. 29.

Fig. 31 is a vertical section taken on the line 31—31 of Fig. 4.

Fig. 32 is a plan showing the Geneva wheels of the carrier member and the gears operating in conjunction therewith.

Fig. 33 is a front elevation of the same showing the middle wheel in vertical section.

Fig. 34 is a plan of one of the blank strip reel casings and parts carried thereby, the casing being in horizontal section.

Fig. 35 is a vertical section through portions of the pre-bending wheel and feeding wheel on an enlarged scale and taken on the line 35—35 of Fig. 34.

Fig. 36 is a plan of one form of cover blank to be used in my improved cover applying machine.

Fig. 37 is a side elevation of this form as applied on a container.

Fig. 38 is an enlarged detail section of the same taken on the line 38—38 of Fig. 37.

Fig. 41 is a diagrammatic view of the driving gearing of one of the cover applying heads.

Fig. 42 is a central vertical section of the part 166 of a cover applying head.

Fig. 43 is a horizontal section of the same taken on the line 43—43 of Fig. 42.

Fig. 44 is a plan of the centering cam.

Fig. 45 is a diagram illustrating the initial cover folding operation.

Fig. 46 is an enlarged detail vertical section of a part of the cover applying head and illustrating the univeral shafts 140n and 139n.

Figure 6:
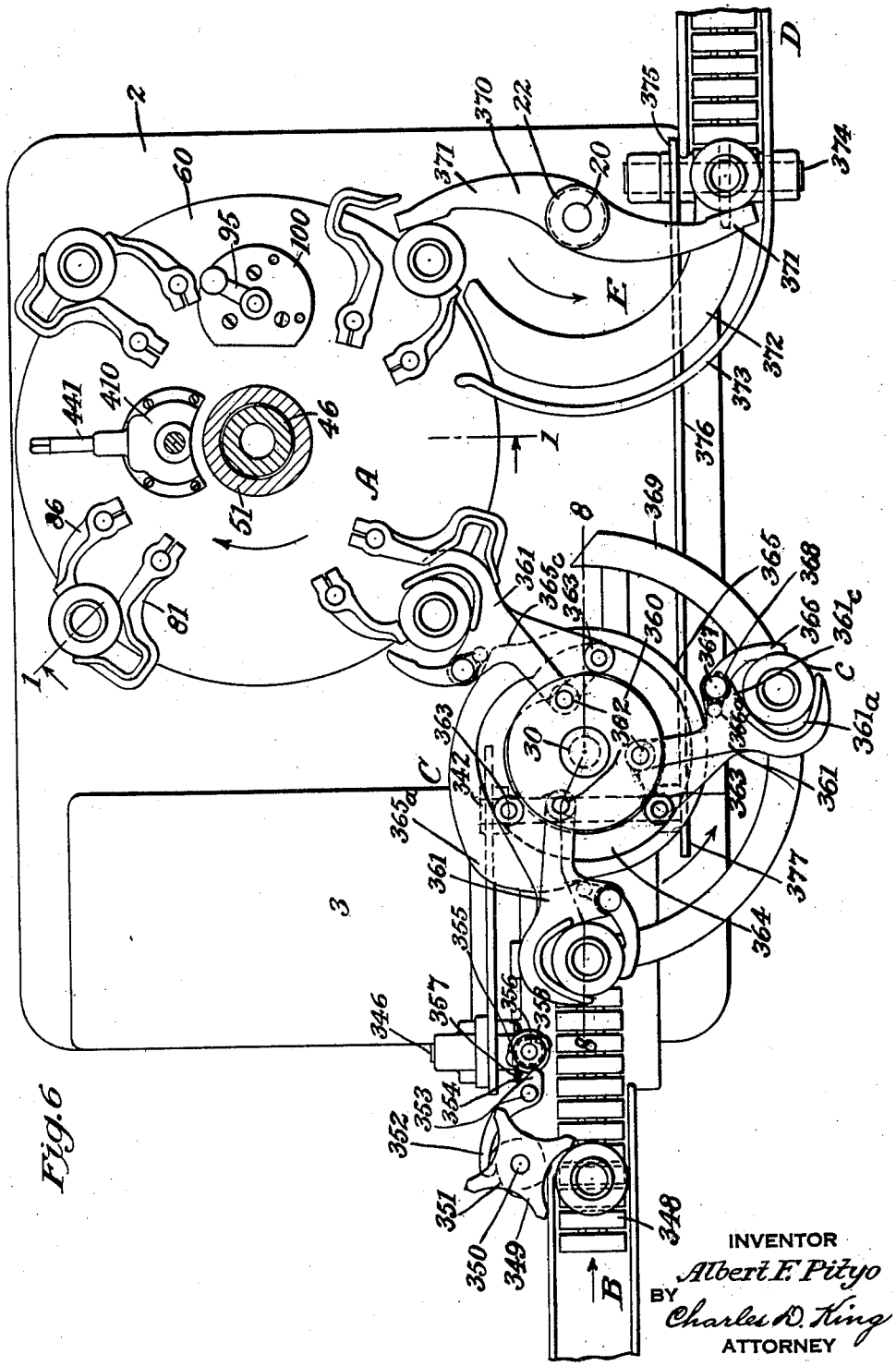
Fig. 6 is a plan of the entire machine partly in horizontal section on the line 4—4 of Fig. 1.

Referring to Fig. 6 of the drawings it will be seen that my improved container cover applying machine comprises a main cover applying mechanism which is indicated by A, a container supply conveyor B, a container transfer mechanism C, a container discharge conveyor D, and a discharge transfer device E.

Figure 1:
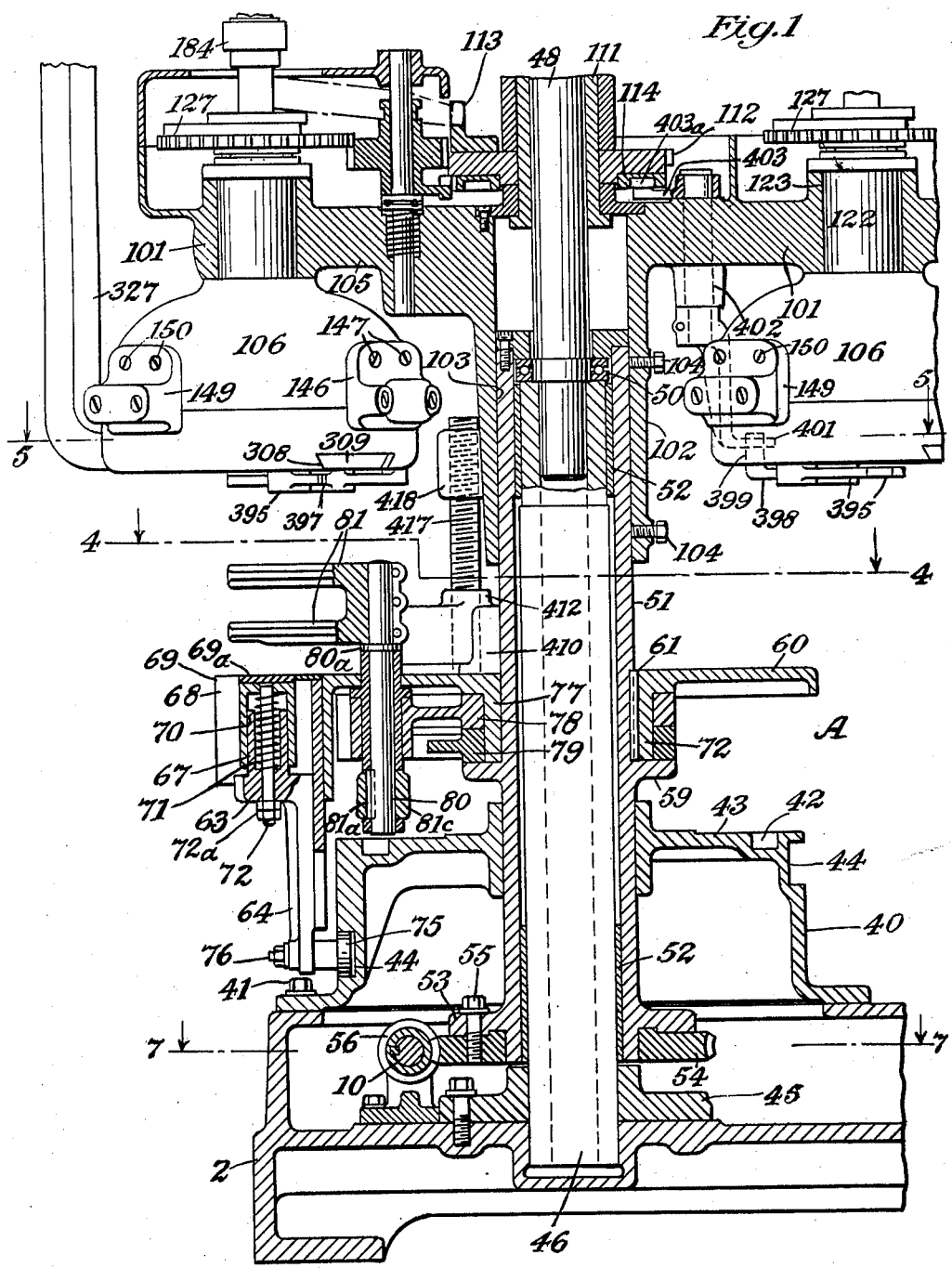
Figure 1 is a central vertical section of the main part of the machine taken on the line 1—1 of Figs. 3 and 4, certain parts being in front elevation.

Referring to Figs. 1 and 7, the numeral 2 indicates the machine base which may be of any suitable form and is here shown as made in a rectangular shape and carried to a height suitable to enclose certain mechanism for driving various portions of the machine. The numeral 3 indicates a standard driving unit and need not be further described except to state that it has at one part a shaft 4 capable of being driven at different speeds and having secured to it the sprocket wheel 5 which is connected to a suitable chain such as 6 which is adapted to drive the sprocket wheel 7 secured by a safety pin 8 to the disk 9 which is keyed to the horizontal shaft 10 journaled in bearings 11 and 12 secured to the base 2.

On the right hand end of the shaft 10 is secured a miter gear 13 which meshes with a companion miter gear 14 secured to the horizontal shaft 15 which lies at right angles to the shaft 10 and is journaled in the bearings 16 and 17 secured to the base 2. Secured to the shaft 15 is a worm 18 which drives the worm wheel 19 secured to the vertical shaft 20, which is journaled in bearings 21 and 22 (see Fig. 6). There is a thrust bearing 15a for the shaft 15 located between the worm 18 and the inner bearing part 17.

Also secured to the shaft 20 is a miter gear 23 which meshes with a companion miter gear 24 secured to a third horizontal shaft 25 journaled in bearings 26 and 27 secured to the base 2. Secured to the shaft 25 is a bevel gear 28 which meshes with a larger bevel gear 29 secured to the second vertical shaft 30 which is journaled in a bearing 31 and sleeve 32 in the pedestal 33 which is secured to the base 2 by the bolts 34. Connected with the vertical shaft 20 is the mechanism E, and connected with the vertical shaft 30 are the mechanisms B and C, all of which will be more fully described hereinafter.

Referring to Figs. 1 and 4, it will be seen that the main cover applying mechanism embodies a stationary annular platform 40 which is secured to the base 2 by bolts 41 and has two box cam grooves or slots, one being indicated by 42 and located in its upper flat part and the other indicated by 44 located in its periphery. Rigidly secured to the base member 2, assisted by a bracket 45 bolted to the base member, is the tubular vertical column or shaft 46, having a solid shaft 48 secured to its upper part and extending upward as far as and having the multiple pathed stationary cam 49 secured to its upper end. At the upper end of the tubular shaft 46 is a thrust bearing 50 on which the sleeve 51 is rotatively mounted. The said sleeve 51 extends downwardly along the tubular shaft 46 and is journaled thereon by the bushings 52 forced into the two end parts of said sleeve.

At the lower end of the sleeve 51 is a flange 53 to which is securely fastened a worm wheel 54 by means of the bolts 55. Said worm wheel is arranged to be driven by the worm 56 which is keyed to the horizontal shaft 10. There is a thrust bearing 57 for the shaft 10 between the worm 56 and the inner bearing part 12 of said shaft.

There is a second flange 59 on the sleeve 51 and mounted thereon and secured to the sleeve 51 by the key 61 is the container platform or turn table 60. The said platform has four upright guides 62 secured thereto by suitable bolts 62a. Slidable in each guide is a member 63 having a depending portion 64, a dovetailed portion 65 which fits corresponding ways 66 on the guide 62, and a cylindrical or cup-shaped portion 67. There is a member 68 having three ribs 69 and a bore 70 which fits the portion 67 so as to slide thereon and is normally pressed upward by a coil spring 71 which is limited in its upward movement by the stop bolt 72 and nuts 72a. 69a is a cushion on the part 67.

There is a groove 73 in the member 63 and one of the ribs 69 bears therein and prevents the member 68 from turning. The depending part 64 has an anti-friction roller 75 journaled thereon by suitable means such as a bolt 76 and said roller moves in the cam slot 44 of the platform 40, so that on rotation of the rotary platform 60, the members 64 are moved up and down, thus correspondingly moving containers carried on the members 63 on the cushions 69a.

The container platform 60 has a hub 77 on which two spiders 78 and 79 are movably mounted, being held in place one above the other on the flange 59 of the sleeve 51. The spider 78 has arms 78a which journal the shafts 80 provided with collars 80a above which are secured the movable grippers 81. At the lower ends of the shafts 80 are arms 81c secured thereon by keys 81a and provided at their outer ends with anti-friction rollers 82 which bear in the box cam groove 42 in the platform 40. The grippers 81 have slots 83 in their outer parts which merge into flaring parts 83a to grasp the containers c.

The spider 79 has arms 84 in which are secured shafts 85 and on the upper ends of said shafts are secured normally stationary grippers 86 which bear against one side of the containers while the grippers 81 center and grip them on the opposite side.

The openings in the platform 60 for the shafts 80 and 85 are elongated circumferentially of the platform to permit relative movement of the said shafts and circumferential movement of the spiders 78 and 79.

Two of these openings 60a are shown in broken lines in Fig. 4, and similar circumferential openings 60a are provided in platform 60, for the other shafts 80 and 85.

The spiders 78 and 79 have lugs which are numbered 87 and 87a respectively, and each lug has a slot, said slots being numbered 88 and 88a respectively. In said slots are movable blocks numbered 90 and 91 respectively. Each of said blocks has a bore 92 which journals an eccentric 93 secured to a shaft 94 which has an arm 95 secured to its upper part and is journaled by its intermediate portion in a bearing 97 in the bearing plate casting 100 which is secured to the platform 60. The arm 95 is provided with a spring plunger 98 which is adapted to enter the holes 99 of the bearing plate 100. The eccentrics 93 are arranged so that their "throws" are respectively on opposite sides of the shaft 94. It will be apparent that on moving the arm 95, the eccentrics 93 will be turned, thus moving the blocks 90 and 91. These in turn will move their respective spiders and the arms thereof oppositely, so as to move the grippers 81 and 86 toward or from each other, thus providing for gripping containers of different sizes.

There is a rotary carrier member 101 having a hub 102, the bore 103 of which fits the outside of the sleeve 51 and is secured thereto by bolts 104. The carrier member has four branches 105, and in each branch is mounted a cover applying head 106. Mounted on the carrier member are brackets 107, one for each branch, and each bracket 107 serves to fulcrum three levers, 108, 109 and 110 which extend from the cam 49 to the respective cover applying heads, there being a set of said levers for each of said heads. There is a sleeve 111 secured to the shaft 48 and stationary therewith. On said sleeve are secured the gear 112, and the combined stop wheel and centering cam 114 all of which are stationary together with the shifting cam 113.

There are four vertical bores 115 formed in the carrier member 101, one in each of the branches 105 thereof between its capping head and the shaft 48, and in each bore is a vertical shaft 116. Each bore 115 has a recess 117, each shaft 116 has a collar 118, and there is a coil spring 119 in each of the recesses 117 which spring bears against a collar 118 to hold up the gear 331. The gears 331 are movable vertically by mechanism hereinafter to be described.

Cover applying heads

Each cover applying head 106 has a casing 121 having a tubular upper part 122 by means of which it is mounted in the bore 123 in the carrier member 101 secured by the nut 101a, and a lower part 124 of much larger diameter and somewhat resembling a bell and which houses most of the cover applying mechanism.

There is a tubular member 125 rotatable in the tubular part 122 of the casing 121. The said member 125 is screw threaded at 126 and has a gear wheel 127 secured to it below said screw threaded part. On the latter is placed the nut 128 which secures the gear wheel in position assisted by the key 127a. Secured to the upper side of the gear wheel 127 is a cam 129 and secured to the latter is a second cam 130 the purpose and operation of both of which will be hereinafter more fully described. The gear wheel 127 is supported by a thrust bearing 131 placed at the upper end of the tubular part 122 and the tubular member 125 is journaled in the member 122 by means of the bushings 132 forced into the bore of said member. The number 133 indicates the lower part of the member 125 and said part is of considerably larger diameter than the upper part. It has a flange 134 and a cylindrical portion 135 which surround a cylindrical recess 136.

Under the flange 134 and surrounding the portion 135 are four gear rings indicated by 137, 138, 139 and 140. These are of the type termed mutilated gears and each has gear teeth on parts only of its periphery and will be further described hereinafter. The said gear rings are held on the portion 135 by a key 141 and bolts 142.

The lower part 124 of the head casing 121 has four rectangular channels two of which are indicated by 143. The other two channels are indicated by 144 and are at right angles to the channels 143. The said channels all extend from the periphery of the casing 121 about two thirds of the distance to the center thereof.

The channels 143 serve to support the fastener securing devices or curlers 145 and are closed at their outer ends by caps 146 held by screws 147.

The channels 144 support the tab aligning devices 148 and are closed by the caps 149 held by the screws 150. The curlers 145 and aligning devices 148 have side grooves 151 and 152 respectively and are secured in position in their respective channels by plates 153 held by screws 154.

Within the tubular member 125 and extending down into its cylindrical recess 136 is a second tubular member 155 which has an enlarged part 156 located in said recess and provided with outwardly extending projections 157 which are secured to the lower part 124 of the casing 121 by bolts 158. The member 155 has an upwardly extending recess 159 which houses the cover folding die 160 and the folders or jaw members 161 and 162. The folders 161 are pivoted on pins 163 in the slots 164 of the member 155.

Slidable in the bore 165 of the member 155 is a third tubular member 166 which has four lugs 167 at its lower part. Said lugs have slots 168 in which are pivoted the folders 162 on the pins 169. The die member 160 is secured to the lower sides of the lugs 167 by screws 171. There are four pins 172 each slidable in one of the lugs 167 and aligned to engage one of the four folders 162. Upward movement of the member 166 brings the pins 172 against the stop screws 173 in the member 155 and causes the movement of the folders 162 to press the plain untabbed sections of the cover. The folders 162 are normally held in their open position by the coil springs 174a. The operation of the die and folders will be more fully described hereinafter.

The folders 161 press the lower parts of the fastener carrying sections and the laterally tabbed sections and are moved to and fro by means of the collars 174 on the tube 175 which is slidable in the member 166, and which has an extension 175a which is screw threaded at its upper part to receive the nut 176. The latter lies in a recess 177a of the collar 177 and a coil spring 178 is placed in said recess so as to be interposed between the collar 177 and nut 176 to maintain resilient connection between them. The collar 177 is provided with a groove 177c for connection to the fork of the lever 109, said lever being adapted to be moved by means of the anti-friction roller 109a moving in the cam slot 180 of the stationary cam 49 as the carrier member 101 revolves.

Slidable up and down in the tube 175 is the rod 181 having the blank holder 182 secured to its lower end. Its upper end is screw threaded to receive the screw threaded collar 183 and the lock nut 184 for locking the collar in place. The collar 183 has a groove 183a for connecting it with the fork of the lever 108 which lever is given movement by the anti-friction roller 108a moving on the cam path 185 of the cam 49.

Tab aligning devices

Each of the tab aligning devices 148 is provided with a housing 187, which has ways 188 in its lower part. Housing 187 is provided with flanges 189 and grooves 152 by which it is secured in the channel 144 in the casing part 124. Each housing 187 has a cover 190 secured to it by screws 191. Each said cover is provided with a hub 190a in which is formed a bearing 190c for the short shaft 192. There is an outer slide 193 provided with a groove 194 and transverse openings 195 leading to the same. There is also an inner slide 196 having an extended narrow part 197 to slide in the groove 194 of the outer slide and also having a wider part 196a which extends into the openings 195. Two spring pockets 198 are provided in its rearward part in which the coil springs 199 are placed to bear against the projections 200 of the outer slide and normally press the inner slide forward. The outer slide is provided with spring pockets 201 at its upper side. When the slides are assembled they together fit the grooves or ways 188 in the lower part of the housing 187. Mounted on the inner slide by means of the screw 202 is a bifurcated tab aligning member 203 having two tab aligning portions 204 and two upwardly extending portions 205 against which the coil springs 206 located in the pockets 201 are adapted to press for causing a swivelling action to the member 203.

The outer slide 193 carries two cam rollers 207 journaled on the pins 208 secured to the slide, said rollers engaging the cam 209 secured to the shaft 192 so as to reciprocate said slide. The upper end of the shaft 192 is screw threaded at 192a to receive the screw threaded collar 210 for holding it in proper position in the housing 187. There is a socket 211 in the upper end of said shaft so shaped that its driving element can be inserted in only one way.

Fastener securing devices or curlers

Each of the fastener securing devices or curlers 145 is provided with a housing 212 having ways 213 in the interior thereof and having flanges 214 provided with grooves 151. Each housing 212 has a cover 215 provided with a hub 215a and a bearing therein for the shaft 216. There is a main slide 217 having a front central slot 218 in its lower part and a rear slot 220. There is an oblong perforation in the top of the slide 217 through which the shaft 216 passes.

There is an inner curler carrying slide 221 which is reciprocative in the slots 218 and 220 of the main slide 217, and said slide 221 has side slots 222, curler recesses 223, spring pockets 224 and plunger pockets 224a. There is also an outer curler slide 225 having four upwardly arranged projections, the two rearward ones 226 being adapted to lie in the side slots 222 and the two forward ones lying against the curlers 228. There is a nose piece 229 mounted on the main slide 217 by rivets 229a.

The curlers 228 are held in the recesses 223 of the inner curler slide 221 by means of their inner ends 228a, which are rounded and of greater width than the forward parts of said curlers. Said forward parts have concave ends to perform the curling operations. Two levers 231 are provided one on each side of the main slide 217 and said levers 231 are pivoted at 232 in the side slots 219 of the main slide. Each of the levers 231 has an anti-friction roller 233 by means of which it is operated by one of the two cams 234 secured to the shaft 216. There are springs 231d to turn the levers 231 towards the cams 234. The opposite ends of the levers 231 are provided with inwardly curved members 231a which are adapted to move the lateral tabs of the cover blanks. Said members 231a have slots 231d.

The main curler slide 217 is provided with two cam rollers 236 journaled on the pins 237 secured to the slide, the said cam rollers being adapted to be moved by the cams 238 and 239 secured to the shaft 216. The slide 221 has anti-friction rollers 240 which are pivoted on the pins 241. Said slide 221 is moved to and fro by the rollers 240 and the cam 242. The forward part 243 of slide 221 is slightly concaved and forms slots 244 with the projections 227 of the slide 225 in which slots the curlers 228 are placed.

Strip feed mechanism

On the upper part of the carrier member 101 are three bosses 250, to each of which is secured a bracket 251. Secured to the brackets is a plate 252 and on said plate is a ball race 253. There is a turn table 254 rotatable on the balls 255 in the ball race and a shoulder stud 257 rotatively connecting the turn table 254 to the plate 252.

There is an upright wall 258 secured to the plate 252 by screws 259 and at the upper part of said wall is a plate 260 secured to wall 258 by screws 261 and similar in shape to the plate 252. The plate 260 has an upright wall 262 secured to it similar to the wall 258 and the wall 262 has a plate 263 secured to its upper part similar to 252. Secured to the plate 263 is a wall 264 similar to 258 and on said wall is a plate 265 similar to the plate 252. Secured to the plate 265 is a wall 266 similar to 258 and secured to the upper part of the wall 266 is a top plate 267. The plates 260, 263 and 265 are respectively provided with ball races 253, balls 255, turn tables 254 and studs 257.

Each turn table 254 is adapted to support a strip carrying reel such as 269 which has two flanges 270, a cylindrical part 271, and the lower flange has downward extending parts 272 and 273, the former resting on the turn table 254 and the latter serving to center the reel thereon. The plates 252, 260 and wall 258 together form a casing which encloses the lower reel 269, feed wheel 274, a fastener pre-bending wheel 275, and two guide rollers 276 and 277.

Fastener pre-bending means

The strip feeding wheel 274 is mounted on a shaft 278 journaled in bearings such as 279 in the plates 252 and 260. The said plates also have bearings 280 which journal the shaft 281 on which is secured the pre-bending wheel 275. The shafts 278 and 281 have gears 284 and 285 respectively secured to them so that the wheels 274 and 275 rotate in synchronism for the operation of the pre-bending elements.

The feed wheel 274 has a beveled ring 288 between the parts 286 and 287 and each of said two parts has teeth 289 arranged to feed the blank strip S. Each of said two parts is arranged with a recess 290. The pre-bending wheel 275 has two flanges 291 spaced apart and a disk 292 between the two flanges, all of said parts being secured to the shaft 281.

The disk 292 has apertures 293 to receive the pins 294 on which the heads 295 are secured by means of the pins 296. The latter extend at each side into the slots 293a in the flanges 291. There are compression springs 294a coiled around the pins 294 between the disk 292 and the heads 295 to normally force the heads toward the feed wheel 274. The end parts 385 of the metallic fasteners of the cover blanks are bent outwardly by the flanges 291 against the beveled sides of the ring 288. The heads 295 are resiliently pressed against the ring 288 as the wheels 274 and 275 revolve in opposite directions. There are guide rollers 276 and 277 mounted on stud shafts 297 and 298 respectively in the plate 252.

The shaft 278 is revolved by means of one of the shafts 301, which has a socket 302 in which the shaft 278 engages. Secured to the lower end of the shaft 301 is a ratchet wheel 303 which is revolved by means of the pawl 304 oscillated by the lever 305 having at its end an anti-friction roller 306, which roller is moved by the cam 129 secured to the upper part of one of the gears 127.

As illustrated in Fig. 2, the plates 252, 260, 263, 265, wall portions 262, 264 and 266, and top plate 267 form three successive casings in which other three reels 269 are housed. The said casings each contain feed wheels 274, fastener pre-bending wheels 275, and guide rollers 276 and 277 all arranged in a manner similar to that shown in Figs. 2 and 35.

Formed in the casing 121 of each of the cover applying heads 106 are ways 308 in which the feed slides 309 are adapted to reciprocate. The slides are each provided with two blank feeding fingers 310 and blank guides 311. They are actuated by levers 312 fulcrumed on the casings of the heads 106. Each lever 312 is moved by a crank pin 313 engaging a block 314 movable in the slot 315 of its lever 312.

There is a pin 316 secured to each slide and journaled in a block 317 movable lengthwise in the slot 318 of the lever 312. The crank pin 313 is mounted in a disk 319 secured to the shaft 320 on the upper end of which is secured the gear 321 which meshes with the ring gear 322 secured to the member 135 and revolving with it.

Each of the slides 309 has cut-off knives 323, 323a, the latter of which is stationary and the former is operated by a rod 324 and roller 324a from the cam 325.

At 326 in Figs. 2 and 34 is shown an opening in the reel casing through which the reel 269 can be put in place or removed to receive fresh material. Adjacent each guide roller 277 is a blank strip chute 327 which extends downward in a suitable path to one of the feed slides 309 and its cutting-off device.

It will be noted in Fig. 3, that there are four each of the shafts 301, ratchets 303, pawls 304, levers 305, and cams 307 so that there is a set on each branch 105 of the carrier member 101.

The four casings carrying the reels 269 are located one over the other as shown in Fig. 2 so that the four feed wheels 274 and shafts 278 thereof are respectively over the four shafts 301 and the sockets therein, the shafts 278 engaging in said sockets and being driven by the shafts 301 as the carrier member 101 revolves. The outer guide rollers 277 are at ninety degrees to each other in adjacent casings and are adjacent the chutes 327 which are also at ninety degrees to each other in adjacent casings. The said chutes respectively connect with the four cover applying heads which are also arranged at ninety degrees to one another as illustrated in Fig. 3.

Pivoted on the revolving carrier member 101 at 330n are four yoke levers 330 one for each cover applying head, each such lever surrounding one of the shafts 116. On each shaft 116 is slidably mounted a member consisting of a gear 331 having a hub 332 with an annular groove 333 therein engaging two pins 334 secured to its respective yoke lever 330. Also secured to each of these members is a Geneva segment 35 as shown in Figs. 32 and 33. The gears 331 mesh with the gears 127 on the cover applying heads 106. Concentric with the gear 112 is a stationary stop wheel 114. As the carrier member 101 revolves, the rollers 336 on the respective yoke levers 330 successively move over the stationary cam 113. This causes each yoke lever 330, together with its associated gear 331 and Geneva segment 335 to move upward, and the parts temporarily remain in this position by means of the respective spring 119.

The member 166 is externally screw threaded at its upper end and is joined to the internally screw threaded tube 166a which has a nut 166c on its screw threaded upper end. Below the nut 166c is a slidable collar 184 having an annular recess 184a in which is a coil spring 184c interposed between the collar 184 and the nut 166c. The collar 184 engages the pins 110a in the lever 110 so that the collar is adapted to be moved by the action of the anti-friction roller 110c moving along the lower cam path 180a of the cam 49 and acting on said lever 110.

Each tube 166a has a slot 166s in its left hand side as seen in Fig. 9, the respective tube 175a has a slot 175s and the respective rod 181 has a slot 181s. The right hand portion 330k of the respective double lever 330 extends into all three of the above mentioned slots and is adapted to be acted upon by the respective rod 181 when the respective blank holder 182 is moved upward by a container c.

Each cam has a notch 130n and said cam revolves with its cover applying head so that the roller 330a on the respective lever 330 drops into said notch when the other end of the lever is held up which occurs when the cam 113 is in action or by means of the pressure of the spring 119. When said roller 330a is thus held in said notch the respective gear 127 is held in a pre-determined position ready to start the cycle of covering operations.

Operation of each lever 330 is effected by the upward movement of the respective rod 181 when the container c presses up against the respective blank holder 182, moving the respective roller 330a upward out of the respective notch 130n and leaving the respective gear 127 free to revolve when the gearing illustrated in Figs. 32 and 33 comes into action.

The carrier member 101 at this time has carried the respective lever 330 beyond the cam 113 so that the left hand end of the respective lever 330 is free to move down. Further upward movement of the respective rod 181 caused by movement of the container c, causes the respective lever 330 to move the respective gear 331 and respective segment 335 down, the gear 331 going into mesh with the stationary gear 112 and the segment 335 coming out of contact with the Geneva gear 114. The gear 127 is now revolved for one revolution and is then brought to rest by the roller 330a on the lever 330 again going into the notch 130n of the cam 130. The cover applying operation for this particular container is now completed and the head is set for the next container.

During the one revolution of the gear 127 the carrier member 101 has also made one revolution so that the roller 338 of the lever 330 is carried up by means of the cam 113, thus causing the gear 331 to come out of mesh with the gear 112 and the segment 335 to go into contact with the stop wheel 114. Thus the rotation means are cut off from the gear 127.

Fig. 41 illustrates the operation of the driving mechanism of the tab aligning devices, the fastener securing devices and also of that of the feed slides 309, the proportion of certain parts being altered for the sake of greater clearness of illustration. The ring gears 137 and 138 respectively operate the pinions 137a and 138a of the tab aligning devices 148 to turn the shafts 192. The ring gears 139 and 140 respectively operate the pinions 139a and 140a to turn the shafts 216 of the curling devices 145. The ring gear 322, which is below all the others, operates to turn the gears 321 and shaft 320, thus moving the feed slides 309 as described in the construction of that device.

Figure 10:
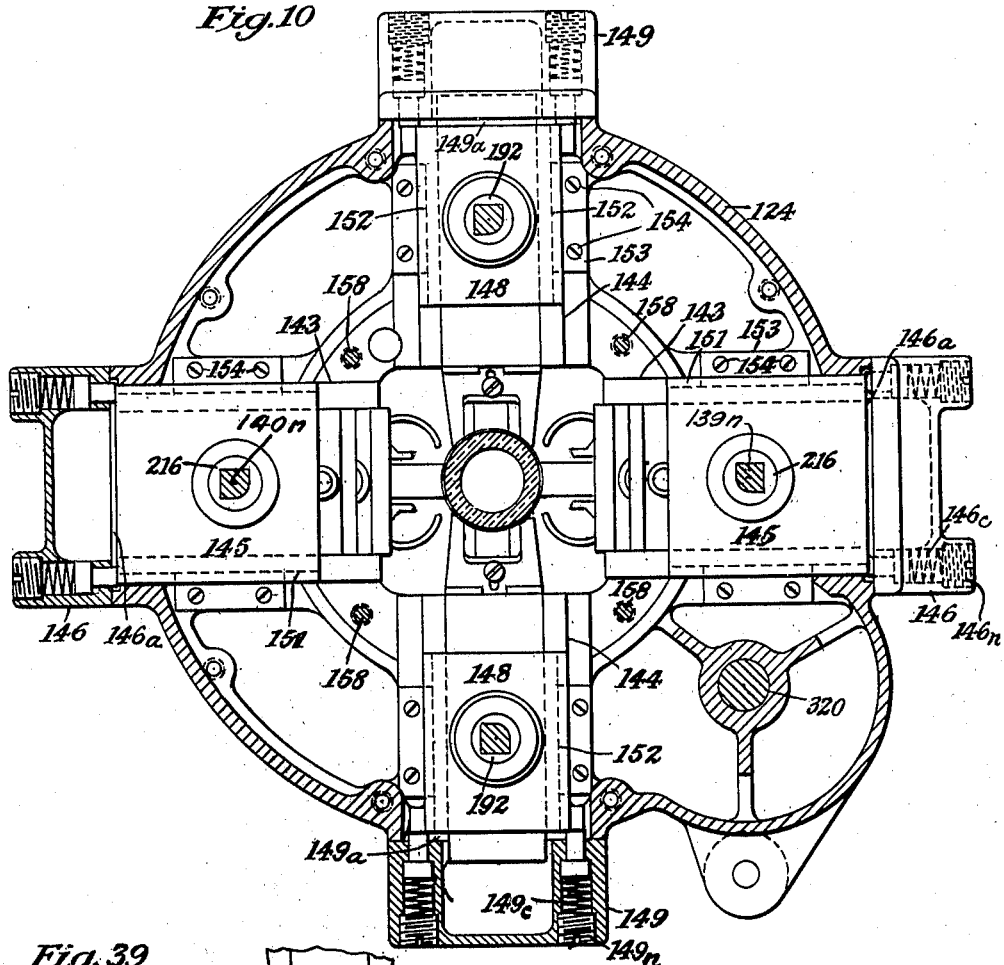
Fig. 10 is an enlarged horizontal section of the same taken on the line 10—10 of Fig. 9.

Referring to Fig. 9, it will be seen that the pinions 139a and 140a are secured to the sleeves 139s and 140s which are journaled in bearings 139c and 140c in the casing 121. 139n and 140n are universal shafts, which are respectively held in assembled relation with the sleeves 139s and 140s by respective members 139g and 140g. Each said member 139g and 140g has an annular concave recess R, whose longitudinal cross-section is an arc of a circle. Each sleeve 139s and 140s has an annular convex projection, which interfits with the respective annular recess R of the respective shaft 139n or 140n. Each shaft 139n and 140n is thus prevented from moving in the direction of its longitudinal axis, relative to the respective sleeve 139s and 140s, and each said shaft can tilt relative to its respective sleeve. As shown in Fig. 10, the lower end of each said shaft 139n and 140n is of angular contour, and each said lower angular end fits into a corresponding socket of a shaft 216, so that each shaft 139n and 140n rotates a shaft 216. The aligning devices have sleeves similar to 139s, and shafts similar to 139n. Said similar shafts of the aligning devices are connected to and drive the shafts 192.

The aligning devices and curling devices are adapted to move in their respective grooved seats a short distance in either direction to adjust themselves to different sizes of containers, that is, in the spaces 149a and 146a, and more or less tension is brought on the springs 149c and 146c to adjust them thereto by turning the screws 149n and 146n. The shafts 139n, 140n, being of the universal type, will properly drive the respective mechanism when their axes have been shifted by the slight changes in position of said mechanism brought about as above described.

*Container transfer and discharge mechanism*

The vertical shaft 36 has a worm 340 secured to it which drives the worm wheel 341 secured to the short shaft 342 on which is secured to the sprocket 343. The latter drives the chain 344 which revolves the sprocket 347 which drives the endless chain container conveyor 348. There is a star wheel 349 journaled on a stud 350 and secured to the star wheel is a ratchet 351 which is normally held from turning by the pawl 352 pivoted at 353. The pawl has a projection 354 which is moved by the cam 355 which on rotating moves the pawl out of engagement with the ratchet thus allowing the latter to be turned when the star wheel is rotated by a container on the conveyor 348. The cam 355 is journaled on the stud 356 and rotated by a bevel gear 357 meshing with the bevel gear 358 on the shaft 346.

Secured to the upper end of the shaft 30 is a double flange 360 in which three gripping levers 361 are pivoted by pins 362. The said levers 361 have anti-friction rollers 363 which move in the slot 364 of the stationary cam 365. Each of the levers 361 has a concave portion 361a and an extension 361c on which a finger lever 366 is pivoted by a stud 367. Each finger lever 366 has an anti-friction roller 366a and a coil spring 368 which normally holds it in its closed position against a container c. It is adapted to be opened at the container engaging and discharging positions by the parts 365a and 365c respectively of the cam 365. There is a curved runway 369 on which the containers are moved through the transfer mechanism.

As soon as the containers have been sealed by the mechanism A, they are delivered to the discharge mechanism E which is operated by the shaft 20 and embodies a rotary pusher 370 having arms 371 and secured to the upper end of the shaft 20. There is an arcuate runway 372 and a guard member 373 which keeps the containers on the same when propelled by the pusher 370. The discharge conveyor D is operated from the shaft 374 which is rotated by the sprocket 375 driven by the chain 376 which in turn is driven by the sprocket 377 secured to the shaft 342.

Referring to Figs. 36, 37 and 38, b indicates one form of cover blank adapted to be applied by this machine. This blank has a container mouth covering or central portion 380, laterally tabbed skirt sections 381 which have lateral integral tabs 382, metallic fastener carrying skirt sections 383 which have metallic fasteners 384 which have fastener tongues 385 which have fastener prongs 386, plain intermediate sections 387, triangular scored parts 388, scorings 389 for the central part and scorings 389a for the skirt parts. The prongs 386 secure the fasteners 384 to the upper parts of the sections 383.

Fig. 37 illustrates the outside of the cover as applied on the neck of a milk bottle, in which figure 390 indicates the edges of the folded-in pleats of the cover, 391 indicates the curled up fastener tongues coiled in with the ends of the lateral tabs 382. Fig. 38 shows the pleats and curled parts in horizontal section taken on the line 38—38 of Fig. 37.

Below each of the slides 309 is a container centering device which comprises two oscillating arms 395 having portions 395a which grip the containers and are pivoted to the casing 124 at 396. Each of said arms has a gear segment 397 by which the two arms are geared together. One of the arms 395 has an extension 398 provided with a projection 399 engaging in the slot 400 of the arm 401. The latter is secured to the shaft 402 journaled in the carrier member 101. On the upper end of the shaft 402 is the arm 403 carrying the anti-friction roller 403a which engages with the centering cam 114 (see Figs. 1 and 44). It will be noted that said cam has a movable block 404 normally pressed toward the periphery of the cam by springs 405. When the centering device operates on a container, the block 404 can yield slightly by reason of the springs 405 and thus avoids breakage of the containers if they vary in size.

There is a raising and lowering device for the purpose of adapting the machine to containers of different heights. Secured on the turn table 60 by screws 411 is a housing 410 having a vertical hub 412 and a journal bearing 413 extending outwardly at right angles thereto and in which is journaled the shaft 414 having a squared outer end for the application of an implement for turning it and a bevel gear 415 secured to its inner end. The gear 415 meshes with a gear 416 secured to the lifting screw 417, which is journaled in the hub 412 just above the gear 416. The screw 417 extends upward above the hub 412 and into a screw threaded projection 418 on the hub of the carrier member 101. Turning of the shaft 414 raises or lowers the carrier member, together with the cover applying heads, blank strip reels and casings therefor and all the mechanism mounted on the carrier member 101.

The operation of the machine is as follows:

Power being applied to the driving unit 3, causes the rotation of the shaft 4 and sprocket 5. The latter causes the chain 6 to rotate the sprocket 7, disk 9 and shaft 10. The worm 56 on the latter causes the worm gear 54 to revolve the sleeve 51, which in turn revolves the carrier member 101 thus operating the cover applying heads and parts associated therewith. The miter gears 13 and 14 cause the shaft 15 to revolve, together with the worm 18 which in turn rotates the worm gear 19 on the first vertical shaft 20 and the latter causes the rotation of the discharge container pusher 370.

The miter gear 23 rotates the miter gear 24 causing rotation of the shaft 25 and the bevel gears 28 and 29 causing the second vertical shaft 30 to revolve. The worm 340 on the latter causes the worm gear 341 to rotate together with the shaft 342. The sprocket 343 on the latter drives the chain 344 and the latter causes the sprocket 345 to move the endless chain conveyor 346 which causes the movement of uncovered containers into the transfer mechanism C. Containers are transferred one by one from the transfer mechanism C onto the turn table 60 of the main machine A and are gripped between the stationary grip levers 86 and the movable grip levers 81 and held securely on the turn table 60, which is revolved by means of the worm gear 54 and sleeve 51. The containers are supplied with covers and remain on the turn table until they reach the mechanism E as shown in Fig. 6. The containers at this point have been sealed and are now taken to the discharge conveyor D.

As soon as a container is gripped by the levers 81 and 86, it is caused to rise by reason of the upward movement of the member 64, caused by its roller 75 moving in the cam slot 44. The gripping action of the levers 81 and 86 is just sufficient to permit up and down movement of the containers as they rest on the disk 69a of the member 64. The gripping of said levers is controlled by the roller 81c in the cam slot 42.

As a container is thus raised, it comes into engagement with one of the cover applying heads 106 and against a cover blank b. It is raised still higher until the blank b engages the blank holder 182 and together with the latter is still further raised to the position shown in Fig. 45 and finally to those shown in Figs. 9 and 11.

The initial folding of the plain or untabbed skirt sections 387 is effected by the lower parts of the folders 162. The cover blank b is held between the mouth m of the container c and the blank holder 182, and said blank is pushed up until sections 387 are brought against the lower ends of the folders 162. The scorings in the blank permit the sections 387 to be folded down first, by the said folders 162. The blank is then pushed against the die 160, causing the tabbed and fastener carrying sections to be folded, but the tabbed sections and the fasteners themselves, do not pass through the die 160 but remain below it. At this time the tube 166 is given an upward movement by means of the collar 184, lever 110 and cam path 180a, which is synchronised with the container movement until the tube 166 comes to a predetermined position which is controlled by the associated operating parts. During this upward movement of the tube 166, the folders 162 abut the pins 172 and pins 172 are moved against the set screws 173, thus causing the folders 162 to rotate, so that their lower parts press the lower parts of the sections 387 against the container neck, as shown in Fig. 11. When the bottle is in its top position, the folders 161 are now moved to press the blank, such movement being effected by means of the collars 174, tube 175, collar 177, lever 109 and cam slot 180. The cover is now in condition for the final securing of the tabs 382 and fasteners 384.

Figure 39:
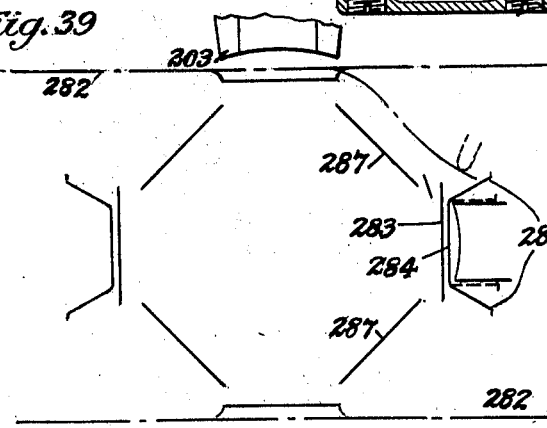
Fig. 39 is a diagrammatic view illustrating the method of applying the cover blank.

As the operation of the means for operating the cover applying heads with the tab aligning devices and curling devices thereon has been described in considerable detail, it will be unnecessary to describe it further at this time except to state that said gear 127 is now caused to rotate for one turn and then come to rest. This causes the tab aligning devices 148 and fastener securing devices 145 to be actuated by the ring gears 137, 138, 139, 140, turning the pinions 137a, 138a, 139a, 140a, causing rotation of the cams 209 of the devices 148, and cams 238, 239, 234, 242, of the devices 145. The bifurcated members 203 now engages the lateral tabs 382 and move them towards the container neck. The ends of said tabs are now engaged by the members 231a and moved towards the slides 221, and the nose pieces 229 press against the lower parts of the sections 383 and the middle of the fasteners 384. This condition is shown in Fig. 39.

Figure 40:
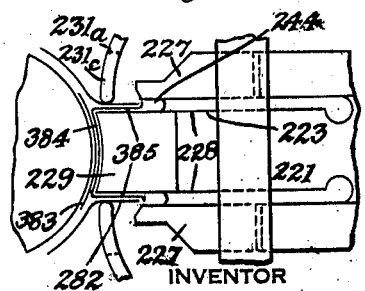
Fig. 40 is a similar view showing a further step in said method.

In Fig. 40, the tabs 382 are shown as pressed against the fastener tongues 385 which have been bent by the members 231a until they lie against the edges of the recesses 223 ready to enter the curler slots 244. The juxtaposed tabs and tongues now lie in line with the curlers 228. The slide 221 continues to move forward by action of the cam 242 and the concave ends of the curlers 228 roll the tab and tongue into the form shown in Fig. 38. Thus the final securing of one of this form of covers is completed.

The carrier member 101 and turn table 60 continue to revolve presenting the next container, cover applying head and cover blank, which last is applied in a manner similar to the foregoing, and so on with others as long as the machine is kept operating.

What I claim is:

1. In combination, in a container cover applying mechanism, a head casing embodying means for mounting a plurality of ring gears, a plurality of curling mechanisms carried by the casing and each provided with a driving pinion meshing with one of said ring gears during a part of the revolution of the gear, and means to rotate said gear.

2. A tab aligning device embodying two adjacent longitudinally movable members slidable relatively to each other, resilient means between adjacent parts of said members, a bifurcated tab aligning element mounted on and movable with one of the slidable members, and actuating means for said members and element.

3. A tab aligning device embodying a housing, two slides reciprocative in the housing, one of the slides slidable within the other, a tab aligning member having two spaced contact elements mounted for movement with one of said slides, and means for reciprocating the slides.

4. A fastener securing device embodying two adjacent slidable members said members forming two spaced slots, two fastener securing members respectively secured to one of said slidable members and movable to and fro in said slots, and means to reciprocate said slidable members.

5. A curling device embodying a housing, three slidable members reciprocative in said housing, two of them movable in the third, said first two members forming two curler slots parallel to each other, two curlers respectively located in said curler slots, two oscillating members mounted on the third slidable member, means to oscillate said oscillating members to bring fastening elements into the curler slots, and means to move the curlers to effect final securing of the fasteners.

6. In a machine of the class described, means for feeding a strip of blanks of pliant material provided with pre-attached fasteners, and means cooperative therewith for pre-bending said fasteners.

7. In a container cover applying machine, means for feeding a strip of container cover blanks provided with pre-attached metallic fasteners, and means connected with said feeding means for pre-bending said fasteners.

8. In combination, in a container cover applying machine, a plurality of cover blank strip reel casings arranged in a stack and having a common axis, a blank strip reel in each such casing, means in each such casing for pre-bending fasteners on the blank strip when unrolling from its reel, a strip chute beyond said means associated with each casing, a plurality of guide rollers in each casing, and driving means for the mechanisms in said casings connected with the cover applying part of the machine.

9. In combination, in a machine of the class described, a rotary container platform, two spiders rotative on the same axis as said platform each of said spiders having an equal number of arms, a plurality of fixed grippers mounted respectively on the arms of one of said spiders and extending above said platform, a plurality of grippers pivoted respectively on the arms of the second spider and also extending above said platform, operating arms connected to each pivoted gripper, a cam to actuate said arms, and means to shift the spiders about their central axis relatively to each other to space the grippers toward and from each other.

10. In a bottle hooding machine: a plurality of vertically movable bottle supports, means to actuate said supports, a head frame above said supports, stationary cam means adjacent said head frame, and a plurality of heads each aligned to one of said bottle supports and including initial hood folding means, and a folding die adapted to slip over the hooded bottle to press the skirt of the hood against the bottle, and means for final securing of the hood on the bottle neck, said means outward of the initial means, surrounding the same and including members to additionally press the skirt of the hood against the bottle neck.

11. In combination, in a container cover applying machine, a cover blank strip reel, a casing having a compartment for said reel and a compartment for fastener pre-bending means, means in the compartment therefor for pre-bending fasteners on a fastener strip when unrolling the strip, guide rollers associated with said reel and pre-bending means, and driving means for said mechanism connected with the cover applying part of the machine.

12. In combination, in a machine of the class described, a rotary container platform, two gripper carrying members rotative on the same axis as said platform, a plurality of fixed grippers mounted on one of said carrying members, a plurality of movable grippers mounted on the other of said carrying members all of said grippers extending above said platform the movable and fixed grippers respectively in gripping relation to each other, operating arms one for each movable gripper, means to move said arms to effect opening and closing of the movable grippers, and means to shift the carrying members to cause changes in the positions of their respective grippers.

13. Mechanism for folding a hood around the top of the neck of a bottle, comprising a vertically movable plunger having a head, means adapted to apply a hood-blank to the underside of the head, means adapted to push the top of the bottle upwardly against the underside of the blank, a die, said head being located in said die, a vertically movable support for said die, said plunger and its head being movable upwardly relative to said die, said support having first folding fingers pivotally connected thereto, the lower ends of said first folding fingers being located below the bottom of the die, said lower ends being spaced from each other to contact with spaced parts of the blank which extend beyond the top of the bottle and to downwardly bend said spaced parts of the blank when the blank is moved upwardly relative to said first folding fingers, the die being shaped to downwardly bend the remainder of the blank after said spaced parts of the blank have been bent downwardly, means adapted to move said plunger and said support and said die upwardly in unison with the bottle after the die has operated on the blank as aforesaid, so that the downwardly bent portions of the blank remain below the bottom of the die, stop means adapted to abut said first folding fingers and to turn said folding fingers relative to said support in order to press said spaced parts of the blank inwardly against the outer upstanding wall of the bottle, additional turnable folding fingers pivotally connected to a fixed member, said additional folding fingers being located to press the remainder of the blank inwardly against the outer upstanding wall of the bottle, means adapted to turn said additional folding fingers after the first folding fingers have been operated.

14. Mechanism for folding and pleating a hood-blank of the predetermined width around the neck of a container, said neck having a predetermined width, comprising container-raising means adapted to move the container vertically upward, a clamp adapted to clamp the hood-blank at the top-wall of said neck of the container, a support for said clamp, said clamp being connected yieldingly to said support and being movable upwardly in unison with the container-raising means and with a blank which is clamped by said clamp against said top-wall, first folders spaced from each other in a horizontal plane and located to contact with respective portions of the blank laterally outwardly of said top-wall, a folding device adapted to contact with the blank intermediate said first folders and laterally outwardly of said top-wall, said first folders having bottom end-portions which are located below the bottom of said folding device, said clamp being located laterally inwardly of said first folders and said folding device, said folding device being located laterally intermediate said clamp and said first folders, said container-raising means being adapted to move the container upwardly in order to clamp the blank between said top-wall and said clamp, said clamp being upwardly movable independently of said first folders and of said folding device under the upward thrust of the container, said bottom end-portions operating to bend the respective portions of the blank downwardly after the blank is thus clamped and before the blank contacts with said folding device and during the upward movement of the container, said folding device then operating to fold the remaining portions of the blank downwardly during said upward movement of the container, said container-raising means raising the clamp under the upward thrust of the bottle from a normal position which is below the bottom of said folding device to an upper position in which the clamp is located above the bottom of said folding device, the bottom of the downwardly folded blank being then located below the bottom of the folding device, means adapted to raise the first folders and the folding device substantially in unison with said container-raising means after the blank has thus been downwardly folded, power-driven means adapted then to move said lower end-portions laterally inwardly to press the respecive portions of the blank laterally inwardly against the upstanding wall of the container, second movable folders, said second movable folders being located to contact with the blank-portions which have been downwardly folded by said folding device, power-driven means adapted to move the second movable folders laterally inwardly to press the respective portions of the blank laterally inwardly against the neck of the bottle.

15. A device according to claim 14 in which the second folders are supported independently of the first folders and the folding device.

ALBERT F. PITYO.